United States Patent [19]

Ceurvorst et al.

[11] Patent Number: 5,023,315
[45] Date of Patent: Jun. 11, 1991

[54] PROCESS FOR PREPARING ARYLENE SULFIDE POLYMERS

[75] Inventors: Joseph G. Ceurvorst, Arvada, Colo.; Lacey E. Scoggins, Bartlesville, Okla.

[73] Assignee: Phillips Peteroleum Company, Bartlesville, Okla.

[21] Appl. No.: 510,903

[22] Filed: Apr. 18, 1990

[51] Int. Cl.$^5$ .............................................. C08G 69/14
[52] U.S. Cl. .................................. 528/323; 528/326; 528/388
[58] Field of Search ........................ 528/388, 323, 326

[56] References Cited

U.S. PATENT DOCUMENTS

| | | |
|---|---|---|
| 3,354,129 | 11/1967 | Edmonds, Jr. et al. .............. 260/79 |
| 3,919,177 | 11/1975 | Campbell ............................ 260/79.1 |
| 4,415,729 | 11/1983 | Scoggins et al. .................... 528/388 |
| 4,524,200 | 6/1985 | Sherk et al. .......................... 528/388 |
| 4,529,818 | 7/1985 | Nesheiwat et al. ................. 562/553 |
| 4,734,484 | 3/1988 | Alfes et al. .......................... 528/502 |
| 4,767,841 | 8/1988 | Goetz et al. ......................... 528/388 |
| 4,795,799 | 1/1989 | Cleary .................................. 528/222 |
| 4,808,698 | 2/1989 | Bobsein et al. ...................... 528/388 |

FOREIGN PATENT DOCUMENTS 2163444A 2/1986 United Kingdom .

Primary Examiner—Morton Foelak
Attorney, Agent, or Firm—Kenneth D. Goetz

[57] ABSTRACT

A process for preparing arylene sulfide polymers which comprises the steps of contacting at least one alkali metal hydroxide, water and at least one lactam to form a first mixture comprising an alkali metal aminoalkanoate, water and lactam, and subsequently contacting said first mixture with at least one sulfur source selected from the group consisting of alkali metal bisulfides, thiolactams, and hydrogen sulfide under reaction conditions of time and temperature sufficient to produce a second mixture comprising a polymerizable complex of an alkali metal aminolkanoate and the sulfur source, lactam, water and metal impurities; separating at least a portion of the metal impurities from the second mixture to form a third mixture; contacting at least one dihaloaromatic compound with the third mixture to produce a polymerization mixture; subjecting the polymerization mixture to polymerization conditions of time and temperature sufficient to produce the arylene sulfide polymer; and recovering the arylene sulfide polymer. In a further embodiment, the second mixture may be dehydrated prior to separating at least a portion of the metal impurities from the second mixture, or the third mixture may be dehydrated prior to contacting the third mixture with the dihaloaromatic compound.

27 Claims, No Drawings

PROCESS FOR PREPARING ARYLENE SULFIDE POLYMERS

BACKGROUND OF THE INVENTION

This invention relates to the production of arylene sulfide polymers. In one aspect, this invention relates to the production of phenylene sulfide polymers. In another aspect, this invention relates to the production of cleaner arylene sulfide polymers.

Thermoplastic polymers having a high degree of heat resistance and/or thermal stability for use in applications such as film and fiber are the object of intensive research and development. In applications such as film and fiber, problems that arise include failure during film stretching or fiber drawing, and failure of film when the film is exposed to electric voltage. One cause of such failures is the presence of metal impurities in the recovered polymer which result from corrosion of the process equipment and/or soluble metal impurities present in the feedstocks used during the polymerization process.

Arylene sulfide polymers are thermoplastic polymers known in the art, and processes for making these polymers are disclosed in various U.S. patents including, but not limited to, U.S. Pat. Nos. 3,354,129; 3,919,177; 4,795,799; and 4,808,698. Although these patents represent significant and valuable advances in the art, there is need for a simplified process which can provide arylene sulfide polymers which have a significant amount of the metal impurities removed.

SUMMARY OF THE INVENTION

It is an object of the invention to provide a process for producing arylene sulfide polymer containing a reduced level of metal impurities. It is a further object of the invention to provide a process for producing arylene sulfide polymer having lighter color, i.e. having an improved whiteness color value.

According to the invention, a process for preparing arylene sulfide polymers is provided which comprises the steps of contacting at least one alkali metal hydroxide, water and at least one lactam to form a first mixture comprising an alkali metal aminoalkanoate, water and lactam, and subsequently contacting said first mixture with at least one sulfur source selected from the group consisting of alkali metal bisulfides, thiolactams, and hydrogen sulfide under reaction conditions of time and temperature sufficient to produce a second mixture comprising a polymerizable complex of an alkali metal aminoalkanoate and the sulfur source, lactam, water and metal impurities; separating at least a portion of the metal impurities from the second mixture to form a third mixture; contacting at least one dihaloaromatic compound with the third mixture to produce a polymerization mixture; subjecting the polymerization mixture to polymerization conditions of time and temperature sufficient to produce the arylene sulfide polymer; and recovering the arylene sulfide polymer. In a further embodiment, the second mixture may be dehydrated prior to separating at least a portion of the metal impurities from the second mixture, or the third mixture may be dehydrated prior to contacting the third mixture with the dihaloaromatic compound.

DETAILED DESCRIPTION OF THE INVENTION

This invention relates to a process for preparing arylene sulfide polymers comprising the steps of: (a) contacting at least one alkali metal hydroxide, water and at least one lactam to form a first mixture comprising an alkali metal aminoalkanoate, water and lactam, and subsequently contacting said first mixture with at least one sulfur source selected from the group consisting of alkali metal bisulfides, thiolactams and hydrogen sulfide under reaction conditions of time and temperature sufficient to produce a second mixture comprising a polymerizable complex of an alkali metal aminoalkanoate and the sulfur source, lactam, water and metal impurities, (b) separating at least a portion of the metal impurities from the second mixture to form a third mixture, (c) contacting at least one dihaloaromatic compound with the third mixture to produce a polymerization mixture, (d) subjecting said polymerization mixture to polymerization conditions of time and temperature sufficient to produce the arylene sulfide polymer, and (e) recovering the arylene sulfide polymer. The arylene sulfide polymers having reduced metal impurities and improved whiteness made according to this invention are readily recoverable and well suited for use in applications where such relatively clean arylene sulfide polymers are desired, e.g. film and fiber.

The term "arylene sulfide polymer" is defined by the formula

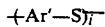

wherein —Ar'—S— is the repeating unit, i is the number of repeating units in the polymer molecule, and Ar' is represented by the formula

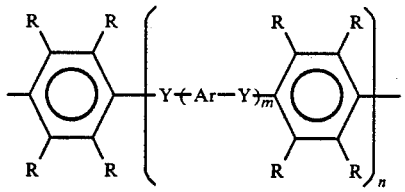

wherein Ar is a divalent radical selected from the group consisting of

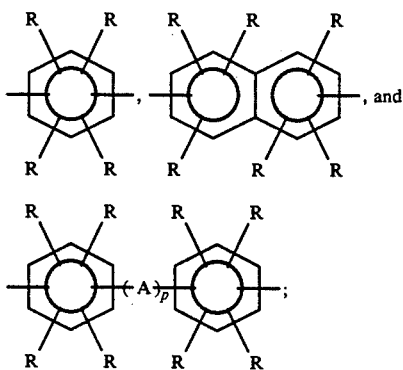

Y is selected from the group consisting of —SO$_2$— an —CO—, m is 0 or 1, n is 0 or 1, p is 0 or 1, A is selected from the group consisting of oxygen, sulfur, sulfonyl and CR$_2$ wherein each R is selected from the group consisting of hydrogen and alkyl radicals having 1 to about 4 carbon atoms, the total number of carbon atoms in all of the R groups in the molecule being 0 to about 12.

Examples of arylene sulfide polymers which can be produced by the process of this invention include those represented by the formulas

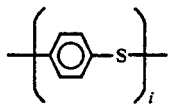

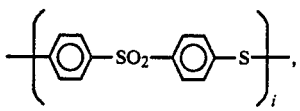

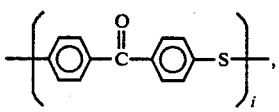

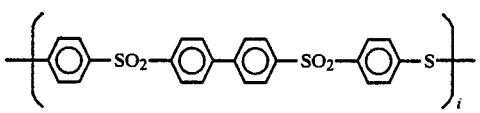

and copolymers thereof. Because of its availability and commercial applicability, poly(phenylene sulfide) is the presently preferred arylene sulfide polymer.

Alkali metal hydroxides that can be employed according to the invention include lithium hydroxide, sodium hydroxide, potassium hydroxide, rubidium hydroxide, cesium hydroxide, and mixtures thereof. Sodium hydroxide is preferred because of ready availability and good results obtained using this compound. The alkali metal hydroxide can conveniently be utilized in the process of the invention as an aqueous solution. For example, an aqueous solution of sodium hydroxide having about 50 weight percent sodium hydroxide is convenient to use.

The lactams that can be employed according to the invention can be represented by the formula

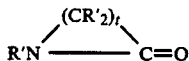

wherein each R' is selected from the group consisting of hydrogen and hydrocarbyl radicals selected from alkyl, cycloalkyl, and aryl, and combinations thereof such as alkaryl, aralkyl, and the like, the number of carbon atoms in each of said hydrocarbyl radicals being in the range of 1 to about 12, t is an integer having a value of 2 to about 12, and the total number of carbon atoms in each molecule of the lactam is within the range of 3 to about 24.

Examples of some lactams which can be employed according to the invention include 2-azetidinone, 2-pyrolidone, 2-piperidone, ε-caprolactam, N-methyl-2-pyrrolidone, N-ethyl-2-piperidone, N-isopropyl-ε-caprolactam, N-dodecyl-3-octyl-2-pyrrolidone, N-cyclopentyl-4-dodecyl-2-piperidone, N-ethyl-2-pyrrolidone, N-cyclohexyl-2-pyrrolidone, N-methyl-ε-caprolactam, N-phenyl-3-butyl-4-benzyl-2-pyrrolidone, N-M-tolyl-2-azetidinone, N-benzyl-4-o-tolyl-2-piperidone, 3-phenyl-2-pyrrolidone, lactam of N-butyl-4-cyclohexyl-7-methyl-8-aminooctanoic acid, lactam of N-octyl-3-ethyl-5-isopropyl-7-aminoheptanoic acid, lactam of 10-aminodecanoic acid, lactam of 13-aminotridecanoic acid, and the like and mixtures thereof.

The amount of lactam employed according to the invention can be conveniently expressed in terms of a molar ratio based on the alkali metal hydroxide employed. Broadly, the molar ratio of lactam on the alkali metal hydroxide employed. Broadly, the molar ratio of lactam to alkali metal hydroxide will be about 1:1 to about 25:1, and preferably about 3:1 to about 12:1.

The alkali metal aminoalkanoates of the invention are produced by reacting an alkali metal hydroxide with a lactam and are used to prepare a polymerizable complex of the alkali metal aminoalkanoate and a sulfur source. The alkali metal aminoalkanoates can be represented by the formula R'$_2$N(CR'$_2$)$_t$CO$_2$M, wherein each R' is as defined above, M is an alkali metal selected from lithium, sodium, potassium, rubidium, and cesium, t is as defined above and the total number of carbon atoms in each molecule of the alkali metal aminoalkanoates is within the range of 3 to about 24.

Examples of some alkali metal aminoalkanoates which can be employed in the process of the invention include lithium aminoacetate, sodium N,N-dimethyl-2-aminopropionate, potassium N-ethyl-3-cyclopentyl-3-aminopropionate, sodium N-methyl-4-aminobutyrate, sodium N-methyl-6-aminohexanoate, rubidium N-isopropyl-3-phenyl-5-aminopentanoate, cesium N-butyl-N-cyclohexyl-3-isopropyl-6-aminohexanoate, potassium N-phenyl-3-butyl-7-aminooctanoate, sodium N-cyclopentyl-4-hexyl-10-aminodecanoate, lithium N-hexyl-6-pentyl-13-aminotridecanoate, sodium N-decyl-4-aminododecanoate, potassium N-nonyl-2-aminotetradecanoate, sodium N-o-tolyl-3-amino-4-phenylbutyrate, rubidium N,N-dibenzyl-2-p-tolyl-3-aminopropionate, cesium 4-aminobutyrate, sodium 5-aminopentanoate, potassium 6-aminohexanoate, sodium N-ethyl-4-aminobutyrate, sodium N-cyclohexyl-4-aminobutyrate, and the like and mixtures thereof. The presently preferred alkali metal aminoalkanoate is sodium N-methyl-4-aminobutyrate because of its effectiveness.

In accordance with the invention, suitable sulfur sources which can be employed in the production of the arylene sulfide polymers include alkali metal bisulfides, thiolactams, and hydrogen sulfide. For the alkali metal bisulfides, the amount of alkali metal hydroxide used will generally be in the range of from about 0.3:1 to about 4:1, preferably about 0.4:1 to about 2:1 moles per mole of alkali metal bisulfide employed. When thiolactams or hydrogen sulfide are employed as the sulfur source, the amount of alkali metal hydroxide used is generally within the range of 1.3:1 to about 5:1, preferably about 1.4:1 to about 3:1 moles per mole of thiolactam or hydrogen sulfide employed.

Alkali metal bisulfides that can be employed according to the invention include lithium bisulfide, sodium bisulfide, potassium bisulfide, rubidium bisulfide, cesium bisulfide, and mixtures thereof. Sodium bisulfide is preferred because of ready availability and good results obtained therewith. The alkali metal bisulfide can conveniently be utilized in the process of the invention as an aqueous solution. For example, an aqueous solution of sodium bisulfide having about 60 weight percent sodium bisulfide is convenient to use.

Thiolactams that can be employed according to the invention include 2-pyrrolidinethione, N-methyl-2-pyrrolidinethione, N-ethyl-2-pyrrolidinethione, N-cyclohexyl-2-pyrrolidinethione, and the like, and mixtures thereof. N-methyl-2-pyrrolidinethione is preferred because of its effectiveness.

The reaction conditions for the production of the polymerizable complex of alkali metal aminoalkanoate and the sulfur source include the utilization of a temperature of about 105° C. to about 205° C. and a time of about 5 minutes to about 6 hours. Although pressure is not limiting in the formation of the polymerizable complex it is preferred that the pressure be sufficient to maintain a liquid phase condition for the first mixture.

The metal impurities which are to be separated from the second mixture include, but are not limited to, reaction products of soluble metal impurities present in the process feedstocks, insoluble metal impurities present in the process feedstocks, and corrosion byproducts resulting from processing which occurs prior to separating the metal impurities from the second mixture.

The process of the invention is advantageous because metal impurities which may not be removed from the feedstocks prior to the formation of the polymerizable complex are readily removed prior to polymerization and subsequent polymer recovery. This is particularly true of the soluble metal impurities in the feedstocks which precipitate during the formation of the alkali metal aminoalkanoate and/or the polymerizable complex. If not removed prior to polymerization and subsequent polymer recovery, a significant portion of the metal impurities may become entrapped within the polymer particles making removal during polymer washing impracticable.

The separation of at least a portion of the metal impurities present in the second mixture from said second mixture can be accomplished by any conventional separation means capable of removing metal impurity particles. Preferably the separation means is capable of removing metal impurity particles of about 5 micron or greater in size. For example, the separation can be accomplished using an in-line, metal cartridge type filter having nominal spacing of about 5 micron to about 20 micron and preferably of about 5 micron to about 10 micron. Furthermore, the separation means is preferably constructed of a corrosion resistant metallurgy to minimize further contamination via corrosion of the separation means.

In a further embodiment of the invention, the second mixture may be dehydrated prior to the separation of at least a portion of said metal impurities from said second mixture to form the third mixture, or the third mixture may be dehydrated prior to the contacting of said third mixture with at least one dihaloaromatic compound to form the polymerization mixture.

The dihaloaromatic compounds that can be employed in the process of the invention can be represented by the formula

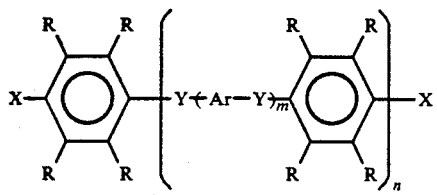

wherein each X is selected from the group consisting of fluorine, chlorine, bromine and iodine; Y is selected from the group consisting of —SO₂— and —CO—, Ar is a divalent radical selected from the group consisting of

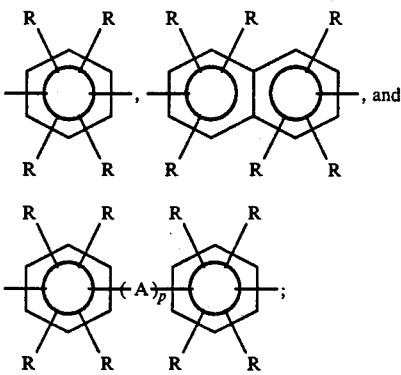

m is 0 or 1, n is 0 or 1, p is 0 or 1, A is selected from the group consisting of oxygen, sulfur, sulfonyl, and CR₂, and each R is selected from the group consisting of hydrogen and alkyl radicals having 1 to about 4 carbon atoms, the total number of carbon atoms in all of the R groups in the molecule being 0 to about 12.

Examples of some dihaloaromatic compounds that can be employed in the process of the invention include p-dichlorobenzene, p-dibromobenzene, p-diiodobenzene, 1-chloro-4-bromobenzene, 1-chloro-4-iodobenzene, 2,5-dichlorotoluene, 2,5-dichloro-p-xylene, bis(p-fluorophenyl)sulfone, bis(p-chlorophenyl)sulfone, bis(p-bromophenyl)sulfone, bis(p-iodophenyl)sulfone, 4,4'-bis(p-chlorophenyl sulfonyl)biphenyl, bis[p-(p-bromophenyl sulfonyl)phenyl]ether, bis[p-(p-chlorophenyl sulfonyl)phenyl]sulfide, bis[p-(p-chlorophenyl sulfonyl)phenyl]sulfone, bis[p-(p-bromophenyl sulfonyl)-phenyl]methane, bis(2,3,5,6-tetramethyl-4-chlorophenyl)sulfone, 4,4'-dichlorobenzophenone, 4,4'-difluorobenzophenone, 4,4'-dibromobenzophenone, 4,4'-diiodobenzophenone, 1,4-bis-(4-fluorobenzoyl)-benzene, 1,4-bis-(4-chlorobenzoyl)-benzene, bis(2,3,5,6-tetramethyl-4-chlorophenyl)ketone, 4,4'-bis-(4-chlorobenzoyl)-biphenyl, and the like, and mixtures of any two or more thereof. The presently preferred dihaloaromatic compounds are p-dichlorobenzene, bis(p-chlorophenyl) sulfone, and 4,4'-dichlorobenzophenone because of their effectiveness and commercial availability.

The amount of dihaloaromatic compound employed according to the invention can be conveniently expressed in terms of a molar ratio based on the sulfur source employed. Broadly, the molar ratio of dihaloaromatic compound to sulfur source will be about 0.9:1 to about 1.2:1, and preferably about 0.95:1 to about 1.05:1.

It is optional, according to the process of the invention, to employ an alkali metal carboxylate as a component in the polymerizable complex forming step and/or the polymerization step. If employed, it is convenient to employ the alkali metal carboxylate in the initial charge of components for preparing the polymerizable complex of an alkali metal aminoalkanoate and a sulfur source. The molar ratio of alkali metal carboxylate to sulfur source can vary over a wide range but generally will be within the range of about 0.05:1 to about 4:1, preferably about 0.1:1 to about 2:1.

Suitable alkali metal carboxylates can be represented by the formula R'''CO₂M wherein R''' is a hydrocarbyl radical selected from alkyl, cycloalkyl, and aryl and combinations thereof such as alkaryl, aralkyl and the like, the number of carbon atoms in said R''' being within the range of 1 to about 20, and M is as defined above.

Examples of some alkali metal carboxylates which can be employed include lithium acetate, sodium acetate, sodium formate, potassium acetate, lithium propionate, sodium propionate, lithium 2-methylpropionate, rubidium butyrate, sodium valerate, cesium hexanoate, lithium heptanoate, lithium 2-methyl octanoate, potassium dodecanoate, sodium octadecanoate, lithium cyclohexane carboxylate, potassium cyclohexylacetate, potassium benzoate, lithium benzoate, sodium benzoate, potassium m-toluate, lithium phenylacetate, sodium 4-phenylcyclohexane carboxylate, potassium p-tolylacetate, and the like, and mixtures thereof. The preferred alkali metal carboxylate, due to its effectiveness and commercial availability, is sodium acetate.

It is also optional, according to the process of the invention, to employ a polyhaloaromatic compound as a component in the polymerization step. The amount of polyhaloaromatic compound which may be employed can be conveniently expressed in terms of a molar ratio based on the sulfur source. Broadly, the molar ratio of polyhaloaromatic compound to sulfur source will be about 0.001:1 to about 0.02:1, preferably about 0.002:1 to about 0.01:1, and most preferably about 0.004:1 to about 0.008:1.

Polyhaloaromatic compounds that can be employed in the process of the invention can be represented by the formula

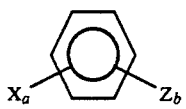

wherein X is a halogen selected from the group consisting of fluorine, chlorine, bromine and iodine, a is 3 or 4, and a+b is 6. When a is 3 each Z is preferably hydrogen. When a is 4, Z can be hydrogen, or any of a variety of substituents including but not limited to alkyl radicals having 1 to about 4 carbon atoms, —$NH_2$ and —OR'' wherein R'' is an alkyl radical having 1 to about 4 carbon atoms.

Examples of suitable polyhaloaromatic compounds that can be employed in the process of the invention include 1,2,3-trichlorobenzene, 1,2,4-trichlorobenzene, 1,3,5-trichlorobenzene, 1,2,3-trifluorobenzene, 1,2,4-trifluorobenzene, 1,3,5-trifluorobenzene, 1,2,3,4-tetrachlorobenzene, 1,2,4,5-tetrachlorobenzene, 1,2,3,5-tetrachlorobenzene, 1,2,3,4-tetrafluorobenzene, 1,2,4,5-tetrafluorobenzene, 1,2,3,5-tetrafluorobenzene, 1,3-dichloro-4-fluorobenzene, 1,3-dichloro-2-fluorobenzene, 2,3,4,5-tetrachloroaniline, 2,3,5,6-tetrachloroaniline, 2,3,4,5-tetrachlorotoluene, 2,3,4,6-tetrachlorotoluene, 2,3,5,6-tetrachlorotoluene, 1-methoxy-2,3,5,6-tetrachlorobenzene, 2-methoxy-1,3,4,5-tetrachlorobenzene, 1-methoxy-2,3,5-trichlorobenzene, and the like, and mixtures of any two or more thereof. The presently preferred polyhaloaromatic compound is 1,2,4-trichlorobenzene because of its effectiveness, economics and commercial availability.

Suitable polymerization conditions include a reaction temperature which can vary over a wide range and will depend to some degree on the particular arylene sulfide polymer being prepared. The reaction temperature will generally be within the range of about 150° C. to about 450° C., and preferably about 175° C. to about 350° C. For example, the preferred reaction temperature for poly(phenylene sulfide) is within the range of about 210° C. to about 350° C., the preferred reaction temperature for poly(phenylene sulfide sulfone) is within the range of about 185° C. to about 225° C., and the preferred reaction temperature for poly(phenylene sulfide ketone) is within the range of about 175° C. to about 350° C. The reaction time can also vary widely depending in part on the reaction temperature employed but generally will be within the range of about 10 minutes to about 72 hours, preferably about 1 hour to about 20 hours. The pressure employed should be sufficient to maintain the polymerization reaction mixture substantially in the liquid phase. The pressure will generally be in the range of about 0 psig to about 400 psig, preferably about 150 psig to about 250 psig.

Although various known methods can be employed for the recovery of the arylene sulfide polymers made according to the invention, it is preferred to employ a method, such as the "water quench" process described in U.S. Pat. No. 4,415,729, wherein the polymerization mixture is contacted at a temperature above that at which the arylene sulfide polymer is soluble in the polymerization mixture with a sufficient amount of a separation agent that is soluble in the lactam and is a non-solvent for the arylene sulfide polymer, e.g. water, to cause or enhance a phase separation. Subsequent cooling of the quenched, phase-separated mixture produces a slurry of particulate arylene sulfide polymer in the lactam which can be filtered to recover the particulate arylene sulfide polymer. The separated polymer can be slurried with a liquid diluent such as water in which the alkali metal halides and other soluble impurities are dissolved. The liquid diluent is removed with dissolved impurities such as by filtration leaving a particular arylene sulfide polymer. This washing process can be repeated until the desired level of arylene sulfide polymer purity is attained. Another known method that can be employed for crystalline arylene sulfide polymers is the process described in U.S. Pat. No. 3,800,845, wherein the heated polymerization mixture is subjected to an isothermal evaporation reducing the pressure on the polymerization mixture from reaction pressure sufficiently to evaporate essentially all of the water and approximately one-third of the lactam and then removing the concentrated polymerization mixture to another vessel by flashing the mixture adiabatically to about atmospheric pressure to remove essentially all of the lactam from the arylene sulfide polymer. The flashed reaction mixture residue can be slurried with a liquid diluent such as water in which the alkali metal halides and other soluble impurities are dissolved. The liquid diluent is removed with dissolved impurities such as by filtration leaving a particular arylene sulfide polymer. This washing process can be repeated until the desired level of arylene sulfide polymer purity is attained.

EXAMPLE I

Two polymerization runs were performed in a 90 gallon stirred (400 rpm) reactor for the preparation of poly(phenylene sulfide) (PPS). The polymerization recipes for these runs are presented below.

|  | Compound, Run 1 | lb-mole Run 2 |
| --- | --- | --- |
| N-methyl-2-pyrrolidone (NMP) | 3.12 | 3.12 |
| Sodium hydroxide (NaOH)[a] | 0.898 | 0.899 |
| Sodium bisulfide (NaSH)[b] | 0.929 | 0.928 |
| p-Dichlorobenzene (p-DCB) | 0.919 | 0.917 |
| Sodium acetate (NaOAc) | 0.28 | 0.28 |

[a]Charged as an aqueous solution of 49.905 wt. % NAOH. The total amount of NaOH includes the amount present as sodium sulfide (Na₂S) in the NaSH.
[b]Charged as an aqueous solution of 59.049 wt. % NaSH and 0.368 wt. % Na₂S. The total amount of NaSH includes the amount present as Na₂S in the NaSH.

In run 1, the aqueous NaOH and aqueous NaSH were premixed in a separate stirred vessel (vessel 1) and heated to approximately 121° C. The liquid mixture was then charged to the polymerization reactor containing 18.1 gallons of NMP and 23 lb (0.28 lb-mole) of NaOAc and followed with an NMP flush of 18.1 gallons.

In run 2, the aqueous NaOH and 12.5 gallons of NMP were charged to a separate stirred vessel (vessel 1) and contacted at 121° C. for 5 hours to form sodium N-methyl-4-aminobutyrate. The aqueous NaSH was then charged to the stirred vessel and the contents held for 30 minutes at 121° C. to form the polymerizable complex. The liquid mixture was then transferred to the polymerization reactor containing 6 gallons of NMP and 23 lb (0.28 lb-mole) of NaOAc through a Cuno Inc., Process Filtration Products 316 SS porous metal cartridge filter having nominal openings of five microns to remove metal impurities. The stirred vessel was then flushed with 17.7 gallons of NMP through the filter to the polymerization reactor.

The feedstocks used in the polymerization runs were sampled for metals analysis. The contents of the stirred vessel was also sampled for each run prior to transfer to the polymerization reactor and analyzed for metals content. In addition, the removed metal impurities of run 2 was also sampled and analyzed for metals content. The results of the metal analyses can be found in Table I.

The following procedures are applicable to both runs 1 and 2.

The contents of the polymerization reactor were then subjected to a dehydration step wherein water plus a small amount of NMP were removed from the polymerization reactor by distillation at a reflux ratio of 1:1. Withdrawal of overhead started at a polymerization reactor temperature of 153° C. and ended at 206° C. over a period of 69-70 minutes. The amount distilled overhead was 65.6-66.1 lbs. The dehydrated mixture was then sampled and analyzed for metals content, and the results can be found in Table I.

Molten p-DCB was then charged to the polymerization reactor at 209°-212° C., the reactor temperature increased to 232° C. at 0.83° C./minute, and held at 232° C. for 2 hours. The reactor temperature was then increased to 265° C. at 1.67° C./minute and held at 265° C. for 3 hours.

The polymerization reactor agitation rate was increased to 500 rpm prior to cooling the reactor. The polymerization reactor temperature was decreased to 135° C. at 0.84° C./minute, 10 gallon of deionized water added and the polymerization reactor contents transferred to a slurry vessel. The polymerization reactor was then flushed with 60 gallons of deionized water to the slurry vessel. The contents of the slurry vessel were heated to 91°-95° C. and a vacuum of 18 inches Hg applied for approximately 2 hours to remove residual p-DCB and a small amount of water.

The contents of the slurry vessel were then filtered on a moving horizontal belt filter system utilizing a nylon filter cloth to separate the granular PPS from the liquid and oligomeric fines. The recovered granular PPS was then reslurried twice with ambient temperature tap water and filtered on the belt filter utilizing an ambient temperature tap water rinse. The recovered granular PPS was then reslurried with deaerated deionized water, heated to 176° C., cooled and filtered on the belt filter utilizing an ambient temperature deionized water rinse. The recovered granular PPS was then sampled for metals content analysis and the results can be found in Table I.

The recovered granular PPS was then dried and sampled for melt flow rate, metals content and color analyses. The results of metals content analyses can be found in Table I and the results of the color analyses can be found in Table II. The melt flow rate was determined using ASTM D1238-86, Condition 315/5.0 modified to use a 5 minute preheat time. The run 1 PPS melt flow rate was found to be 83 g/10 min. and the run 2 PPS melt flow rate was found to be 123 g/10 min. This indicates that the two polymers are of comparable molecular weight such that any potential molecular weight effects on the results should be negligible.

TABLE I

|  | Metals Content Analysis | | | | | | |
| --- | --- | --- | --- | --- | --- | --- | --- |
|  | Metals content (mg/lb polymer)[a] | | | | | | |
|  | Fe | Cr | K | Ni | Ca | Mg | Ti |
| Feedstocks: | | | | | | | |
| NaOH | 6.6 | 0.8 | 32 | 1.3 | 0.4 | 0.1 | — |
| NaSH | 1.2 | 0.6 | 104 | 0.9 | 0.3 | 0.1 | — |
| NMP | 0.8 | 2.1 | 82 | 3.4 | 1.1 | 0.3 | — |
| p-DCB | 1.8 | 1.8 | 42 | 3.2 | 1.3 | 0.1 | — |
| Run 1:[b] | | | | | | | |
| Vessel 1 | 4.8 | 1.5 | 410 | 4.7 | 0.9 | 0.2 | — |
| After Dehydration | 17.4 | 4.4 | 153 | 6.4 | 2.2 | 0.6 | — |
| Polymer After Washing | 12.9 | 1.2 | 6.1 | 11.1 | 346 | 56.3 | — |
| Dried Polymer | 13.3 | 1.4 | 8.8 | 10.4 | 301 | 54.0 | 0.4 |
| Run 2:[c] | | | | | | | |
| Vessel 1 | 3.4 | 2.4 | 133 | 5.0 | 1.3 | 0.4 | — |
| After Filtration & Dehydration | 12.4 | 3.8 | 153 | 6.4 | 2.2 | 0.6 | — |
| Polymer After Washing | 3.0 | 0.2 | 6.9 | 17.7 | 317 | 54.5 | — |
| Dried Polymer | 2.5 | 0.3 | 7.2 | 48.1 | 310 | 52.7 | 0.8 |

TABLE I-continued

| | Metals Content Analysis | | | | | | |
|---|---|---|---|---|---|---|---|
| | Metals content (mg/lb polymer)[a] | | | | | | |
| | Fe | Cr | K | Ni | Ca | Mg | Ti |
| Filtered solids[d] | 60,000 | 5.3 | 2090 | 87 | 9230 | 848 | — |

[a]Determined by plasma emission using an Applied Research Laboratories Model ICPQ 1-37000. The results were converted to mg per lb of polymer recovered.
[b]Control run.
[c]Invention run.
[d]Metals content in ppm of removed metal impurities.

The results in Table I indicate that the process of the invention produces a cleaner polymer as evidenced by the significantly lower metals content, particularly iron and chromium, in the polymer after washing and in the dried polymer. The results also indicate that while polymer washing reduces metal content in control run 1, washing of a polymer produced by the inventive process (run 2) results in an unexpected further reduction of metal content.

The results also indicate that corrosion occurs during the dehydration step as evidenced by a comparison of metals content of the vessel 1 sample (runs 1 and 2) versus the after dehydration sample (run 1) or the after filtration and dehydration sample (run 2). Therefore, it can be inferred that the embodiment of the invention where the separation of metal impurities occurs after dehydration would result in even cleaner polymer.

TABLE II

| | Recovered PPS Color Analysis | | |
|---|---|---|---|
| | Whiteness[a] | | |
| Polymer | L[b] | a[c] | b[d] |
| Run 1:[f] | | | |
| As Dried | 82.66 | −0.77 | 4.71 |
| 2 mm grind[e] | 84.51 | −0.61 | 4.68 |
| Run 2:[g] | | | |
| As Dried | 86.32 | −0.03 | 8.45 |
| 2 mm grind[e] | 86.20 | −0.04 | 9.63 |

[a]Determined using a Hunter Associates Laboratory Inc. Hunterlab Tristimulus Colorimeter Model D25M-9.
[b]L: 100.00 = white, 0.00 = black.
[c]a: (+) = red, (−) = green.
[d]b: (+) = yellow, (−) = blue.
[e]Samples were ground to less than 2 mm particle size to eliminate the effect of shadowing in the colorimeter from the larger particles.
[f]Control run.
[g]Inventive run.

The results in Table II indicate that the process of the invention produces a whiter polymer as evidence by the higher values of "L" for inventive run 2 compared to control run 1 for both the "As Dried" and the "2 mm grind" samples.

Since reduced metals content improves the whiteness of the polymer, it can be inferred that the embodiment of the invention where the separation of the metal impurities occurs after dehydration would result in even whiter polymer.

That which is claimed is:

1. A process for preparing arylene sulfide polymers comprising the steps of:
   (a) contacting at least one alkali metal hydroxide, water and at least one lactam to form a first mixture comprising an alkali metal aminoalkanoate, water and lactam, and subsequently contacting said first mixture with at least one sulfur source selected from the group consisting of alkali metal bisulfides, thiolactams and hydrogen sulfide under reaction conditions of time and temperature sufficient to produce a second mixture comprising a polymerizable complex of said alkali metal aminoalkanoate and said sulfur source, said lactam, water and metal impurities,
   (b) separating at least a portion of said metal impurities from said second mixture to form a third mixture,
   (c) contacting at least one dihaloaromatic compound with said third mixture to produce a polymerization mixture,
   (d) subjecting said polymerization mixture to polymerization conditions of time and temperature sufficient to produce said arylene sulfide polymer, and
   (e) recovering said arylene sulfide polymer.

2. A process according to claim 1 wherein the reaction conditions of step (a) employ a temperature of about 105° C. to about 205° C. and a time of about 6 hours.

3. A process according to claim 2 wherein said lactam comprises a lactam having 3 to about 24 carbon atoms per molecule, said alkali metal bisulfide is selected from the group consisting of lithium bisulfide, sodium bisulfide, potassium bisulfide, rubidium bisulfide and cesium bisulfide, said alkali metal hydroxide is selected from the group consisting of lithium hydroxide, sodium hydroxide, potassium hydroxide, rubidium hydroxide and cesium hydroxide, and said dihaloaromatic compound is represented by the formula $$X-\underset{R}{\underset{R}{\bigcirc}}-(Y-Ar-Y)_m-\underset{R}{\underset{R}{\bigcirc}}-X)_n$$

wherein each X is selected from the group consisting of fluorine, chlorine, bromine and iodine; Y is selected from the group consisting of —SO$_2$— and —CO—, Ar is a divalent radical selected from the group consisting of $$\underset{R}{\underset{R}{\bigcirc}}, \underset{R}{\underset{R}{\bigcirc\bigcirc}}, \text{ and}$$

-continued

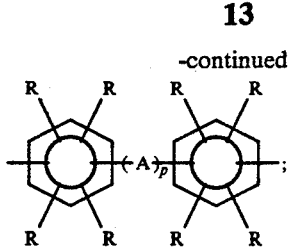

m is 0 or 1, n is 0 or 1, p is 0 or 1; A is selected from the group consisting of oxygen, sulfur, sulfonyl, and CR₂; and each R is selected from the group consisting of hydrogen and alkyl radicals having 1 to about 4 carbon atoms, the total number of carbon atoms in all of the R groups in the molecule being 0 to about 12.

4. A process according to claim 3 wherein the molar ratio of said lactam to said alkali metal hydroxide is about 1:1 to about 25:1, and the molar ratio of said dihaloaromatic compound to said sulfur source is about 0.9:1 to about 1.2:1.

5. A process according to claim 4 wherein said lactam is selected from the group consisting of N-methyl-2-pyrrolidone, N-ethyl-2-pyrrolidone, N-cyclohexyl-2-pyrrolidone, and N-methyl-ε-caprolactam.

6. A process according to claim 5 further comprising an alkali metal carboxylate.

7. A process according to claim 6 further comprising a polyhaloaromatic compound represented by the formula

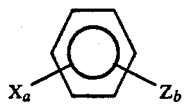

wherein X is a halogen selected from the group consisting of fluorine, chlorine, bromine and iodine, a is 3 or 4, a+b is 6 and Z is selected from the group consisting of hydrogen, alkyl radicals having 1 to about 4 carbon atoms, —NH₂ and —OR" wherein R" is an alkyl radical having 1 to about 4 carbon atoms.

8. A process according to claim 1 wherein said second mixture is dehydrated prior to said separating of step (b).

9. A process according to claim 8 wherein the reaction conditions of step (a) employ a temperature of about 105° C. to about 205° C. and a time of about 5 minutes to about 6 hours.

10. A process according to claim 9 wherein said lactam comprises a lactam having 3 to about 24 carbon atoms per molecule, said alkali metal bisulfide is selected from the group consisting of lithium bisulfide, sodium bisulfide, potassium bisulfide, rubidium bisulfide and cesium bisulfide, said alkali metal hydroxide is selected from the group consisting of lithium hydroxide, sodium hydroxide, potassium hydroxide, rubidium hydroxide and cesium hydroxide, and said dihaloaromatic compound is represented by the formula

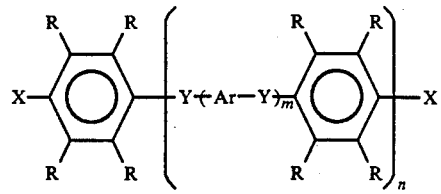

wherein each X is selected from the group consisting of fluorine, chlorine, bromine and iodine; Y is selected from the group consisting of —SO₂— and —CO—, Ar is a divalent radical selected from the group consisting of

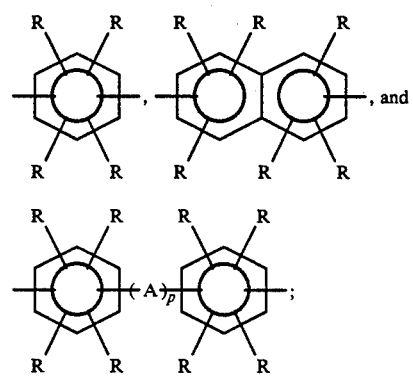

m is 0 or 1, n is 0 or 1, p is 0 or 1; A is selected from the group consisting of oxygen, sulfur, sulfonyl, and CR₂; and each R is selected from the group consisting of hydrogen and alkyl radicals having 1 to about 4 carbon atoms, the total number of carbon atoms in all of the R groups in the molecule being 0 to about 12.

11. A process according to claim 10 wherein the molar ratio of said lactam to said alkali metal hydroxide is about 1:1 to about 25:1, and the molar ratio of said dihalomaromatic compound to said sulfur source is about 0.9:1 to about 1.2:1.

12. A process according to claim 11 wherein said lactam is selected from the group consisting of N-methyl-2-pyrrolidone, N-ethyl-2-pyrrolidone, N-cyclohexyl-2-pyrrolidone, and N-methyl-ε-caprolactam.

13. A process according to claim 12 further comprising an alkali metal carboxylate.

14. A process according to claim 13 further comprising a polyhaloaromatic compound represented by the formula

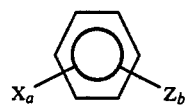

wherein X is a halogen selected from the group consisting of fluorine, chlorine, bromine and iodine, a is 3 or 4, a+b is 6 and Z is selected from the group consisting of hydrogen, alkyl radicals having 1 to about 4 carbon atoms, —NH₂ and —OR" wherein R" is an alkyl radical having 1 to about 4 carbon atoms.

15. A process according to claim 14 wherein said alkali metal hydroxide is sodium hydroxide, said lactam is N-methyl-2-pyrrolidone, said sulfur source is sodium bisulfide, said dihaloaromatic compound is p-dichlorobenzene, and said arylene sulfide polymer is poly(phenylene sulfide).

16. A process according to claim 1 wherein said third mixture is dehydrated prior to said contacting of step (c).

17. A process according to claim 16 wherein the reaction conditions of step (a) employ a temperature of about 105° C. to about 205° C. and a time of about 5 minutes to about 6 hours.

18. A process according to claim 17 wherein said lactam comprises a lactam having 3 to about 24 carbon atoms per molecule, said alkali metal bisulfide is selected from the group consisting of lithium bisulfide, sodium bisulfide, potassium bisulfide, rubidium bisulfide and cesium bisulfide, said alkali metal hydroxide is selected from the group consisting of lithium hydroxide, sodium hydroxide, potassium hydroxide, rubidium hydroxide and cesium hydroxide, and said dihaloaromatic compound is represented by the formula

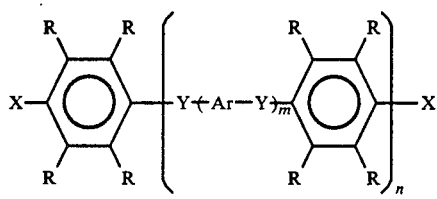

wherein each X is selected from the group consisting of fluorine, chlorine, bromine and iodine; Y is selected from the group consisting of —SO$_2$— and —CO—, Ar is a divalent radical selected from the group consisting of

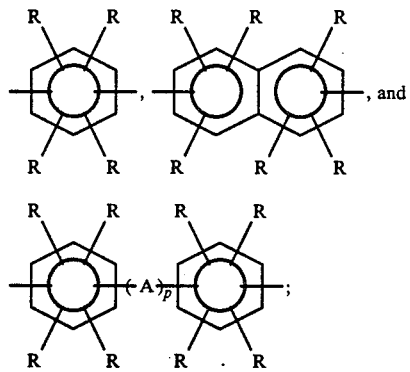

m is 0 or 1, n is 0 or 1, p is 0 or 1; A is selected from the group consisting of oxygen, sulfur, sulfonyl, and CR$_2$; and each R is selected from the group consisting of hydrogen and alkyl radicals having 1 to about 4 carbon atoms, the total number of carbon atoms in all of the R groups in the molecule being 0 to about 12.

19. A process according to claim 18 wherein the molar ratio of said lactam to said alkali metal hydroxide is about 1:1 to about 25:1, and the molar ratio of said dihalomaromatic compound to said sulfur source is about 0.9:1 to about 1.2:1.

20. A process according to claim 19 wherein said lactam is selected from the group consisting of N-methyl-2-pyrrolidone, N-ethyl-2-pyrrolidone, N-cyclohexyl-2-pyrrolidone, and N-methyl-ε-caprolactam.

21. A process according to claim 20 further comprising an alkali metal carboxylate.

22. A process according to claim 21 further comprising a polyhaloaromatic compound represented by the formula

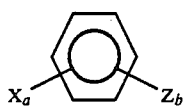

wherein X is a halogen selected from the group consisting of fluorine, chlorine, bromine and iodine, a is 3 or 4, a+b is 6 and Z is selected from the group consisting of hydrogen, alkyl radicals having 1 to about 4 carbon atoms, —NH$_2$ and —OR" wherein R" is an alkyl radical having 1 to about 4 carbon atoms.

23. A process according to claim 22 wherein said alkali metal hydroxide is sodium hydroxide, said lactam is N-methyl-2-pyrrolidone, said sulfur source is sodium bisulfide, said dihaloaromatic compound is p-dichlorobenzene, and said arylene sulfide polymer is poly(phenylene sulfide).

24. A process for preparing poly(phenylene sulfide) comprising the steps of:
  (a) contacting an aqueous sodium hydroxide and N-methyl-2-pyrrolidone to form a first mixture comprising sodium N-methyl-4-aminobutyrate, water and N-methyl-2-pyrrolidone, and subsequently contacting said first mixture with sodium bisulfide under reaction conditions of time and temperature sufficient to produce a second mixture comprising a polymerizable complex of said sodium N-methyl-4-aminobutyrate and said sodium bisulfide, N-methyl-2-pyrrolidone, water and metal impurities wherein said temperature is about 105° C. to about 205° C. and said time is about 5 minutes to about 6 hours,
  (b) separating at least a portion of said metal impurities from said second mixture to form a third mixture,
  (c) contacting p-dichlorobenzene with said third mixture to produce a polymerization mixture,
  (d) subjecting said polymerization mixture to polymerization conditions of time and temperature sufficient to produce said poly(phenylene sulfide), and
  (e) recovering said poly(phenylene sulfide).

25. A process according to claim 24 wherein said polymerization mixture further comprises sodium acetate.

26. A process according to claim 25 wherein said second mixture is dehydrated prior to said separating of step (b).

27. A process according to claim 25 wherein said third mixture is dehydrated prior to said contacting of the step (c).

* * * * *

UNITED STATES PATENT AND TRADEMARK OFFICE
CERTIFICATE OF CORRECTION

PATENT NO. : 5,023,315

DATED : June 11, 1991

INVENTOR(S) : Joseph G. Ceurvorst and Lacey E. Scoggins

It is certified that error appears in the above-identified patent and that said Letters Patent is hereby corrected as shown below:

Column 12, line 34, after "about" (third occurrence), please insert ---5 minutes to about---.

Signed and Sealed this

Thirteenth Day of October, 1992

Attest:

DOUGLAS B. COMER

*Attesting Officer*     *Acting Commissioner of Patents and Trademarks*